April 7, 1959 R. J. BERNOTAS 2,880,746
COMBINATION ACCUMULATOR AND UNLOADING VALVE
Filed June 7, 1957
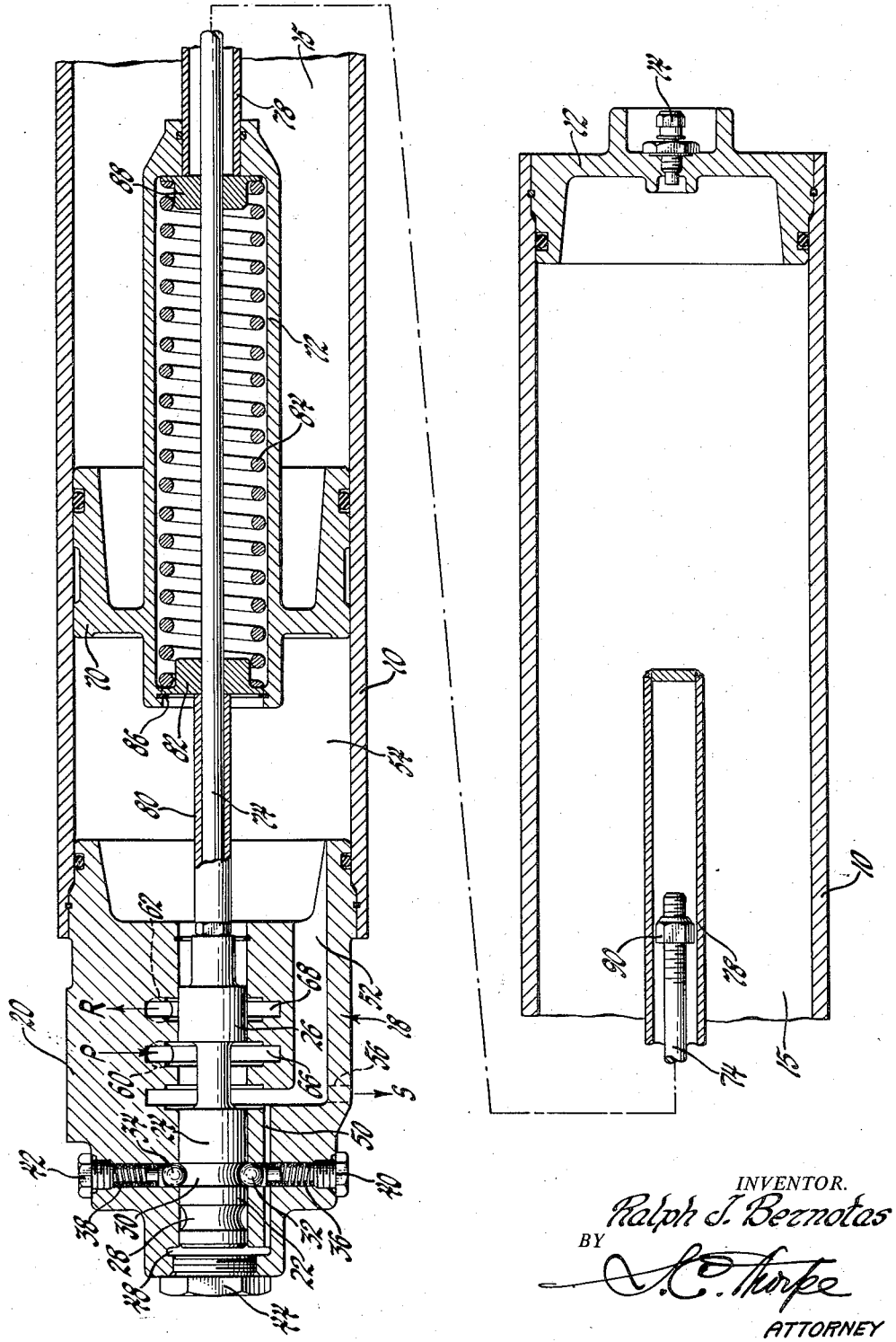
INVENTOR.
Ralph J. Bernotas
BY
ATTORNEY

United States Patent Office 2,880,746
Patented Apr. 7, 1959

2,880,746

COMBINATION ACCUMULATOR AND UNLOADING VALVE

Ralph J. Bernotas, South Euclid, Ohio, assignor to General Motors Corporation, Detroit, Mich., a corporation of Delaware Application June 7, 1957, Serial No. 664,270

5 Claims. (Cl. 137—207)

This invention relates to devices applied in the storing and releasing of fluid energy and more particularly concerns a device of this type which has integrated therewith a valve whereby the loading and unloading of the device is automatically controlled.

Such devices are referred to as "accumulators" and find wide commercial application. Thus, in large aircraft the controls are normally hydraulically operated with the necessary pressure being provided from an accumulator maintained at a predetermined range of pressure by a pump, usually electrically powered. Accumulators are also employed in automotive vehicles, especially heavy off-the-road vehicles requiring power steering, and which incorporate one or more hydraulic jacks applied in the actuation of the working equipment as a dump mechanism, for example.

In general, accumulators are of two types. In one design, the working fluid is expelled from the accumulator by the pressure of a gas contained in a cord-reinforced rubber or plastic bag. Filling of such accumulators is marked by partial collapse of the bag with increase of the pressure of the contained gas. In the second design, there is employed in lieu of an air bag a piston which may be operated either mechanically or by fluid pressure to maintain the working fluid at pressures within the predetermined range.

The present invention is especially applicable to piston-type accumulators and is particularly characterized in that the piston has associated therewith means involved in the actuation of the valve through which the accumulator is loaded and unloaded.

The invention will be described in terms of a preferred embodiment thereof illustrated by the accompanying drawing wherein the device is shown in broken longitudinal section.

In the drawing, the numeral 10 denotes the cylindrical body of the accumulator which is closed at one end by a header 12 comprising an air valve 14. The latter is desirably a Shraeder valve and in the completed installation is connected to a compressor or other source of pneumatic pressure. The gas admitted to the chamber 15 is preferably nitrogen rather than air in order to reduce the fire hazard.

Cylinder 10 opposite the valve 14 is fixedly secured to the body of an unloader valve 18, the housing 20 of which confines a spool 22. Such spool comprises a pair of lands 24, 26 and a pair of annular grooves 28, 30. These grooves are functionally related to ball detents 32, 34, each such detent being under the load of an associated spring 36, 38 respectively. The springs will be seen as fitted into bores in the valve housing 20 and as backed by threaded plugs 40, 42.

At the left end of the housing 20 is a threaded plug 44 closing the central bore for the spool 22. An annular space 48 between the plug 44 and the adjacent wall of the spool 22 has communication via passages 50 and 52 with the chamber 54 of the accumulator. Also connecting with the passage 52 is a port 56 whereby chamber 54 communicates with the actuators served by the accumulator. The system represented by "S" may comprise, for example, a power steering mechanism and one or more hydraulic jacks applied in the raising and lowering of a shovel or scraper, for instance.

In addition to the port 56, the valve housing 20 has therein a port 60 and a port 62. Port 60 should be considered as having communication with the discharge side of a hydraulic pump, not shown, capable of meeting the demands of the system, while port 62 should be taken as connecting with the return line to the pump or to the reservoir from which the pump draws. Within the valve body, port 60 opens to an annular channel 66 and port 62 to an annular channel 68.

Confined within the cylinder 10 constituting the body of the accumulator proper will be noted a piston 70 formed to provide a hollow shaft 72. A stem 74 fixedly secured to the valve spool 22 passes through the shaft 72 and part way through a tubular extension 78 fixed to the shaft 72 and closed at its far end. Stem 74 between the spool 22 and the piston 70 carries a sleeves 80 which at its end nearest the piston abuts a seat 82 for a spring 84 housed within the hollow shaft 72. Seat 82, with the parts in their positions shown, is backed by a snap ring 86 accommodated in an annular groove formed in the shaft 72. A spring seat 88 at the right-hand end of spring 84 is backed by the end wall of the hollow shaft. Beyond such wall the valve stem 74 will be seen as having a nut 90 threaded thereon.

*Operation*

As shown in the drawing, piston 70 is just beginning its stroke to the right, i.e., it is beginning to be recharged with hydraulic fluid supplied through the port 60 via the annular channel 66 and the passage 52. In the event demand is placed on the accumulator during the charging thereof, such demand is met directly by the pressure source, port 56 remaining open throughout the charging of the accumulator. Land 26 of the spool 22 will be noted as completely blocking annular channel 68 and hence port 62 so that the entire output of the pressure source is directed into passage 52.

Now as piston 70 approaches the end of its stroke to the right, nut 90 at the end of valve stem 74 contacts spring seat 88 with the result that spring 84 begins to become compressed. After a predetermined degree of compression of the spring, the resistance represented by springs 36 and 38 associated with the ball detents 32 and 34 is overcome so that spool 22 is snapped to the right and lands 24 and 26 become displaced to positions providing interconnection between ports 60 and 62. Accordingly, the demand on the pressure source is removed and the same simply idles.

The condition as just described continues until the withdrawal of hydraulic fluid from the chamber 54 has allowed the gas pressure in chamber 15 to move the piston 70 again to its shown position. As the piston continues leftward, spring seat 82 is engaged by sleeve 80 so that spring 84 is compressed as before. When the predetermined level of compression is reach, the spring snappingly displaces the spool 22 to the left so that ball detents 32 and 34 shift from annular groove 28 to annular groove 30 and lands 24 and 26 are restored to their shown position, marking the beginning of a new cycle.

It is to be observed that annular chamber 48 to the left of the valve spool 22 is always at accumulator pressure by reason of the passage 50. As a consequence, the spool is always in a condition of substantial hydraulic balance.

What I claim is:

1. An accumulator system comprising: a cylinder, a piston within said cylinder delineating a pair of chambers one of which is adapted to confine an elastic medium, oppositely facing first and second abutment surfaces carried by said piston, a valve associated with said cylinder through which fluid is charged to the other of said chambers, said valve including a housing portion having therein a pressure port, a return port and a charging port and further including a component movable relative to said housing portion between a first position whereat said pressure port is open to said charging port and a second position whereat said pressure port is open to said return port, said relatively movable component having a portion extending into said cylinder carrying third and fourth abutment surfaces positioned at opposite sides of said piston, said third and fourth abutment surfaces being functional with relation to said first and second abutment surfaces respectively, one of each functional pair of abutment surfaces being slidable on said extending portion of said component, and yieldable means operably associated with each said one abutment surface to resist sliding movement thereof when the same is engaged by the coacting abutment surface, the yielding of said yieldable means being accompanied by the storage of energy therein, such energy being applied after a predetermined degree of yielding of said yieldable means to snappingly move said component from one of its said positions to the other.

2. An accumulator system comprising: a cylinder, a piston within said cylinder having oppositely facing first and second abutment surfaces and delineating a pair of chambers one of which is adapted to confine a gas admitted to the chamber under a predetermined pressure, a valve fixed to said cylinder through which fluid is charged to the other of said chambers, said valve including a housing portion having therein a pressure port, a return port and a charging port and further including within said housing portion a spool component axially movable relative to said housing portion between a first position whereat said pressure port is open to said charging port and a second position whereat said pressure port is open to said return port, said spool component having a stem portion extending into said cylinder and through said piston carrying third and fourth abutment surfaces positioned at opposite sides of said piston, said third and fourth abutment surfaces being functional with relation to said first and second abutment surfaces respectively, one of each functional pair of abutment surfaces being slidable on said stem portion, and yieldable means operably associated with each said one abutment surface to resist sliding movement thereof when the same is engaged by the coacting abutment surface, the yielding of said yieldable means being accompanied by the storage of energy therein, such energy being applied after a predetermined degree of yielding of said yieldable means to snappingly move said spool component from one of its said positions to the other.

3. An accumulator system comprising: a cylinder, a piston within said cylinder delineating a pair of chambers one of which is adapted to confine a gas admitted thereto under a predetermined pressure, said piston having an elongated central portion confining a coil spring, first and second abutment members disposed one at either end of said spring, a valve fixed to said cylinder at the end thereof opposite said one chamber, said valve including a housing portion having therein a pressure port, a return port and a charging port open to the adjacent chamber of said cylinder and further including a spool component axially movable within said housing portion between a first position whereat said pressure port is open to said charging port and a second position whereat said pressure port is open to said return port, said spool component having a stem portion extending into said cylinder and through said elongated central portion and said abutments, the latter being slidable thereon, and third and fourth abutments carried by said stem portion outward of said first and second abutments, said third and fourth abutment surfaces being functional with relation to said first and second abutments respectively, said system being characterized in operation in that on axial movement of said piston said spring is compressed by engagement of the coacting abutments in the line of movement of the piston and in that the energy thus stored in such spring is applied after a predetermined degree of compression thereof to snappingly move said spool component from one of its said positions to the other.

4. An accumulator system comprising: a cylinder, a piston within said cylinder delineating a pair of chambers one of which is adapted to confine a gas admitted thereto under a predetermined pressure, said piston having an elongated central portion confining a coil spring, first and second abutment members disposed one at either end of said spring, a valve fixed to said cylinder at the end thereof opposite said one chamber, said valve including a housing portion having therein a pressure port, a return port and a charging port open to the adjacent chamber of said cylinder and further including a spool component axially movable within said housing portion between a first position whereat said pressure port is open to said charging port and a second position whereat said pressure port is open to said return port, said spool component having a stem portion extending through said elongated central portion and said abutments, the latter being slidable thereon, a sleeve member carried by said stem portion between the body of said spool component and the elongated portion of said piston, said sleeve providing an abutment functional with relation to said first abutment member, a nut threaded on said stem beyond the elongated portion of said piston and surrounded by a second sleeve member carried by said elongated portion, said nut providing an abutment functional with relation to said second abutment member, said system being characterized in operation in that on axial movement of said piston said spring is compressed by engagement of the coacting abutments in the line of movement of the piston and in that the energy thus stored in such spring is applied after a predetermined degree of compression thereof to snappingly move said spool component from one of its said positions to the other.

5. A system according to claim 4 where said spool component is provided with a pair of annular grooves adapted to seat detent means carried by said housing portion, said annular grooves corresponding to the two said positions.

References Cited in the file of this patent

UNITED STATES PATENTS 2,490,510    Carleton _____ Dec. 6, 1949